(12) United States Patent
Karidi

(10) Patent No.: US 6,310,697 B1
(45) Date of Patent: Oct. 30, 2001

(54) TEXT ENHANCEMENT SYSTEM

(75) Inventor: Ron J. Karidi, Menlo Park, CA (US)

(73) Assignee: Electronics for Imaging, Inc., Foster City, CA (US)

(*) Notice: Subject to any disclaimer, the term of this patent is extended or adjusted under 35 U.S.C. 154(b) by 0 days.

(21) Appl. No.: 09/111,633

(22) Filed: Jul. 7, 1998

(51) Int. Cl.[7] .................................................. G06F 15/00
(52) U.S. Cl. ......................... 358/1.9; 382/254; 382/274
(58) Field of Search .................................. 382/254, 266, 382/267, 274; 358/1.9, 1.1, 1.3, 1.8, 1.11

(56) References Cited

U.S. PATENT DOCUMENTS

| | | | |
|---|---|---|---|
| 4,853,795 | 8/1989 | Morton et al. | 358/447 |
| 4,945,351 | 7/1990 | Naiman | 340/793 |
| 5,005,011 | 4/1991 | Perlman et al. | 340/728 |
| 5,351,314 | 9/1994 | Vaezi | 382/54 |
| 5,519,815 * | 5/1996 | Klassen | 395/109 |
| 5,521,987 | 5/1996 | Masaki | 382/218 |
| 5,542,006 | 7/1996 | Shustorvich et al. | 382/156 |
| 5,621,825 | 4/1997 | Masaki et al. | 382/274 |
| 5,943,477 * | 8/1999 | Rao et al. | 395/108 |

FOREIGN PATENT DOCUMENTS

| | | | |
|---|---|---|---|
| 0344952 A1 | 12/1989 | (EP) | H04N/17/04 |
| 0552704A2 | 1/1993 | (EP) | G06K/9/36 |
| 0583127A2 | 2/1994 | (EP) | H04N/1/46 |
| 0693740A1 | 1/1996 | (EP) | G06T/11/20 |
| 0723364A2 | 7/1996 | (EP) | H04N/1/60 |
| 0767581A1 | 4/1997 | (EP) | H04N/1/56 |

* cited by examiner

Primary Examiner—Thomas D. Lee
(74) Attorney, Agent, or Firm—Michael A. Glenn

(57) ABSTRACT

A general purpose method for text enhancement that is independent of the type of scanner that is used to scan a document or the device printing the document and is tolerant of the artifacts and defects that the scanning process introduces on the text, mainly blurring. A window of size W×W is constructed on a scanned page with the target pixel at the center of the window and the amount of ink in the window is calculated and the number of pixels that are darker than the center pixel is counted. The window is moved along the page and each pixel on the page has a chance to be the center of a window and be allocated ink. The invention reallocates the amount of ink in full quantities of the darkest value. Only the center pixel actually has its ink reallocated. A key principle is to make an attempt to allocate the ink pixel by pixel in the window, where the darkest pixel gets ink, the second darkest gets ink, and so on, until there is no more ink remaining in the bank. If the center pixel is later in darkness and there is no ink left in the bank, then it is set to white. If the center pixel is reached before the ink runs out, then it is set to black.

9 Claims, 12 Drawing Sheets

Set:

```
count = 0;
sum_dark = 0;
darkest = 255;
``` for (all pixels in the window)
```
{
pixel = current_pixel;
count += pixel < center_pixel;
sum_dark += ink_lut[pixel];
if (pixel<darkest) darkest = pixel;
}
``` if (center_pixel < T1 AND darkest < T1-32 AND count < T2 AND
    sum_dark+256*3/4 >= dot_factor*255* (count + 1)
  new_value = BLACK;
else new_value = WHITE;

401

```
if (center_pixel < T1 AND darkest < T1-32 AND count < T2 AND
    sum_dark+ink_darkest*3/4 >= dot_factor*ink_darkest* (count + 1)
  new_value = ink_darkest;
else new_value = WHITE;
```

Set:

count = 0;
    sum_dark = 0;
    darkest = 255;
    cnt_avg = 0;
    sum_avg = 0;

for (all pixels in the window)
    {
    pixel = current_pixel;
    count += pixel < center_pixel;
    sum_dark += ink_lut[pixel];
    if (pixel<darkest) darkest = pixel;
    if (pixel<clean_threshold) {
      cnt_avg++;
      sum_avg += ink_lut[pixel];
      }
    } if (cnt_avg > 0)
    {
    avg = (sum_avg + cnt_avg/2)/cnt_avg;

if (center_pixel < T1 AND darkest < T1-32 AND count < T2 AND
        sum_dark+avg*3/4 >= dot_factor*avg* (count + 1)
      new_value = avg;
    else new_value = WHITE;
    }
else new_value = WHITE;

Fig. 7

TEXT ENHANCEMENT SYSTEM

BACKGROUND OF THE INVENTION

1. Technical Field

The invention relates to the enhancement of text in a computer environment. More particularly, the invention relates to the enhancement of the text of a digitally scanned document in a computer environment.

2. Description of the Prior Art

Text or pictorial images are often replicated or transmitted by a variety of techniques, such as photocopying, facsimile transmission, and scanning images into a memory device. The process of replication or transmission often tends to degrade the resulting image due to a variety of factors. Degraded images are characterized by indistinct or shifted edges, blended or otherwise connected characters and distorted shapes.

A reproduced or transmitted image that is degraded in quality may be unusable in certain applications. For example, if the reproduced or transmitted image is to be used in conjunction with a character recognition apparatus, the indistinct edges, connected characters, etc. may preclude accurate or successful recognition of characters in the image. Also, if the degraded image is printed or otherwise rendered visible, the image may be more difficult to read and less visually distinct.

There are several approaches to improve image quality. A classical resolution enhancement algorithm is template matching. Template matching attempts to match a line, curve pattern, or linear pattern and then tries to find the best way to reconstruct it with the printing resolution.

Other methods for text enhancement come from the area of Optical Character Recognition (OCR). The main purpose is to isolate the characters from one another. The concern is not for enhancement. The methods apply more to morphological filters which repetitively perform thickening and thinning and opening and closing to get the desired character shape.

U.S. Pat. No. 5,351,314 issued to Vaezi on Sep. 27, 1994, is a method for image enhancement involving the smoothing and thinning of input image data by applying a filter to each pixel of input image data. Characters are segmented and identified based on a comparison of the segmented character to a dictionary of characters.

U.S. Pat. No. 5,542,006 issued to Shustorovich et al. on Jul. 30, 1996, is a method for use in an OCR system for locating center positions of all desired characters within a field of characters such that the desired characters can be subsequently recognized using an appropriate classification process. This method is used for character recognition and not for text enhancement.

There are also standard sharpening filters that convolve the image with a mask and a low-pass filtering kernel and then perform unsharp masking by a linear combination of the original and the blurred image. Another is just to convolve the image with a sharpening kernel. More sophisticated algorithms apply adaptive methods.

U.S. Pat. No. 5,644,648 issued to Bose et al. on Jul. 1, 1997, is a method for recognizing connected and degraded text that filters a scanned image to determine whether a binary image of an image pixel should be complemented. The pixel is complemented only if doing so does not reduce the sharpness of the wedge-like figures in the image.

Other simplistic approaches would be to threshold the text. A grayscale or color scanning of the text is performed. Some portion of the page is identified that is text and it is then thresholded and white placed where it is light and black where it is gray. This however, does not work.

It would be advantageous to provide a text enhancement system that improves the sharpness of the text of a scanned document by increasing the high contrast boundaries which are perceived as sharpness. It would further be advantageous to provide a text enhancement system that takes advantage of the ink centralization property of text and is independent of the type of scanner used.

SUMMARY OF THE INVENTION

The invention provides a text enhancement system. The invention comprises an easy to use page processing system that enhances the text on a digitally scanned page, thereby improving the crispness, clarity, and readability of the text. In addition, the invention is independent of the type of scanner used and utilizes an ink redistribution system that increases the contrast of digitally scanned text or facsimiles.

A preferred embodiment of the invention provides a general purpose method for text enhancement that is independent of the type of scanner that is used to scan a document or the device printing the document. It is tolerant of the artifacts and defects that the scanning process introduces on the text, mainly blurring. The invention is ideal for image reconstruction systems for scanned or digitized images that are not synthetic, i.e., the image is not a result of any PostScript or Page Description Language (PDL) processing.

Typically, a page is scanned and a digitized image is obtained that is usually in an RGB format. If no specific enhancement procedures are applied to the text in the document, then the result is text that is not crisp, clear, or sharp and is therefore harder to read and less pleasant to the eyes.

The invention preserves the amount of ink on the textual part of the page using a consistent method. The text is reconstructed through the reallocation of ink. There is a correspondence between the original amount of ink on the document and the intensity of the ink that the scanner read. The correspondence is either the same or there is some scaling factor involved. The factor is obtained by the fact that there is some overlap between two scanned pixels. The factor is also independent of the location of the pixels.

The new textual image is reconstructed where the same amount or a factor of the ink is preserved. Text has a centralization property. The ink is centralized, that is, there are rarely holes in groups of dark pixels. For example, there is a large white area surrounded by a black area in the letter "O" but it is not at the pixel level, it is at a multi-pixel level. If there are eight pixels that are black surrounding one pixel that is white, then it is likely that the white area is a misread by the scanner and there are actually nine pixels that are black.

The ink on the page is arranged so that it is more centralized, more connected to other pixels that are dark.

A window of size W×W is constructed on a scanned page with the target pixel at the center of the window. The amount of ink in the window is calculated and the number of pixels that are darker than the center pixel is counted. The window is moved along the page and each pixel on the page has a chance to be the center of a window and be allocated ink.

The invention reallocates the amount of ink in full quantities of the darkest value. Only the center pixel will actually have its ink reallocated.

This reallocation is a key feature of the invention. First, attempt to allocate the ink pixel by pixel in the window. The darkest pixel gets ink, the second darkest gets ink, and so on, until there is no more ink remaining in the bank, where the initial amount of ink in the bank is equal to the total amount of ink in the window. If the center pixel is later in darkness and there is no ink left in the bank, then it will become white. If the center pixel is reached before the ink runs out, then it will become black. Only the reallocation to the center pixel becomes effective. The attempt to allocate ink to the other pixels in the window is only done to determine the center pixel's allocation. Those pixels are reallocated ink when they become the center of a current window. The invention is not limited to black text on a white background, it also applies to grayscale, color, and white text on a black background.

For example, the amount of ink in a window is ten and the center pixel is the third darkest in the window. This means that only two other pixels in the window are darker than the center pixel. The invention reallocates the ink to the pixels. Given this example, it is desirable to have the center pixel black. If the amount of ink in the window were only three and the center pixel was sixth in darkness, then no ink would be put in the center pixel because reallocating the amount of ink in the window would not leave any for that pixel.

Other aspects and advantages of the invention will become apparent from the following detailed description in combination with the accompanying drawings, illustrating, by way of example, the principles of the invention.

BRIEF DESCRIPTION OF THE DRAWINGS

FIG. 7 is a pseudo-code example of the ink reallocation scheme for the center pixel of a window that uses the average ink value in the window according to the invention;

DETAILED DESCRIPTION OF THE INVENTION

The invention is embodied in a text enhancement system for scanned text in a computer environment. A system according to the invention provides an easy to use page processing system that enhances the text on a digitally scanned page, thereby improving the crispness, clarity, and readability of the text.

A preferred embodiment of the invention provides a general purpose method for text enhancement that is independent of the type of scanner that is used to scan a document or the device printing the document. It is tolerant of the artifacts and defects that the scanning process introduces on the text, mainly blurring. The invention is ideal for image reconstruction systems for scanned or digitized images that are not synthetic, i.e., the image is not a result of any PostScript or Page Description Language (PDL) interpretation.

Typically, a page is scanned and a digitized image is obtained that is usually in an RGB format. If no specific enhancement procedures are applied to the text in the document, then the result is text that is not crisp, clear, or sharp and is therefore harder to read and less pleasant to the eyes.

The invention preserves the amount of ink on the textual part of the page using a consistent method. For example, in the case with black text on a white background, the amount of ink is measured by measuring the intensity of each pixel, so that the amount of ink is inversely proportional to the intensity. If there is low intensity, it is dark, ie., there is more ink, and vice versa.

The text is reconstructed through the reallocation of ink. There is a correspondence between the original amount of ink on the document and the intensity of the ink that the scanner reads. The correspondence usually involves some scaling factor due to the fact that there is some overlap between two scanned pixels. In our model, this factor is also independent of the relative location within the page.

The new textual image is reconstructed where the corresponding factor of the amount of ink is preserved. An important point is that text has a centralization property. The ink is centralized, that is, there are rarely holes in groups of dark pixels. For example, there is a large white area surrounded by a black area in the letter "O" but it is not at the pixel level, it is at a multi-pixel level. If there are eight pixels that are black surrounding one pixel that is white, then it is likely that the white area is a misread by the scanner and there are actually nine pixels that are black.

Figure 1:
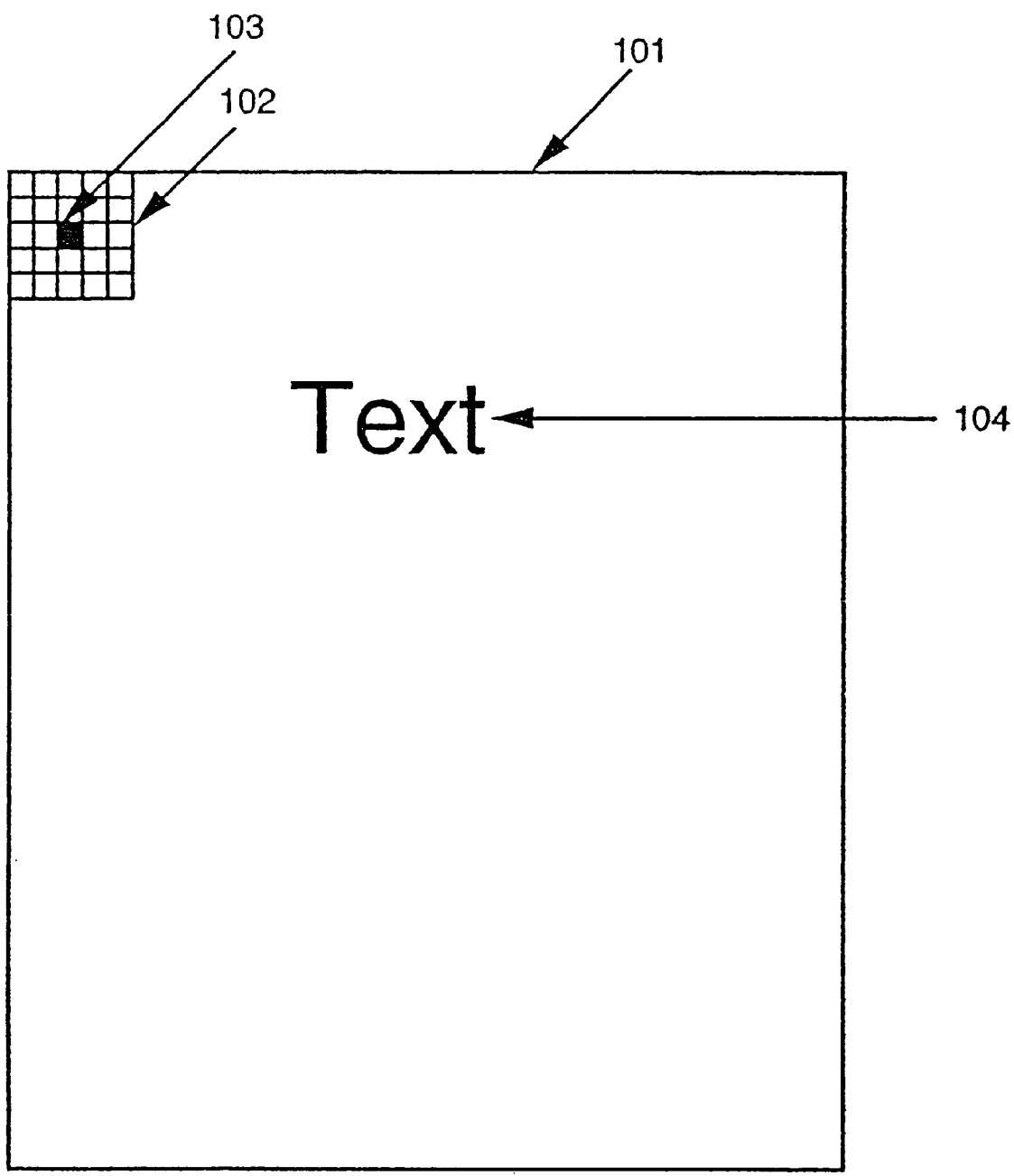
FIG. 1 is a schematic diagram of a 5×5 window on a page of text according to the invention.

Referring to FIG. 1, a window of size W×W 102 is constructed on a page 101 with the target pixel 103 at the center of the window. This means that typically, W is odd. The page 101 contains the scanned text 104. The amount of ink in the window is calculated and the number of pixels that are darker than the center pixel is counted. For purposes of the discussion herein, scanned pixels are an intensity value (0=black, 255=white) and printed pixels are given ink values (0=white, 255=black).

For example, the amount of ink in a window is ten and the center pixel is the third darkest in the window. This means that only two other pixels in the window are darker than the center pixel. The invention reallocates the ink to the pixels. Given this example, it is desirable to have the center pixel black. If the amount of ink in the window were only three and the center pixel was sixth in darkness, then no ink would be put in the center pixel because reallocating the amount of ink in the window would not leave any for that pixel.

The main idea is to reallocate the amount of ink in full quantities of the darkest value. Only the center pixel will actually have its ink reallocated. The ink distribution is only an estimate calculation, the other pixels in the window will get their turn when they become the center pixel as the window moves along the page.

The amount of ink is reallocated by making a binarization. Most pixels will be either totally white or totally black. This reallocation is a key feature of the invention. The ink is allocated pixel by pixel in the window. The darkest pixel gets ink, the second darkest gets ink, and so on, until there is no more ink remaining in the bank. If the center pixel is later in darkness and there is no ink left in the bank, then it will become white. If the center pixel is reached before the ink runs out, then it will become black.

Figure 2:
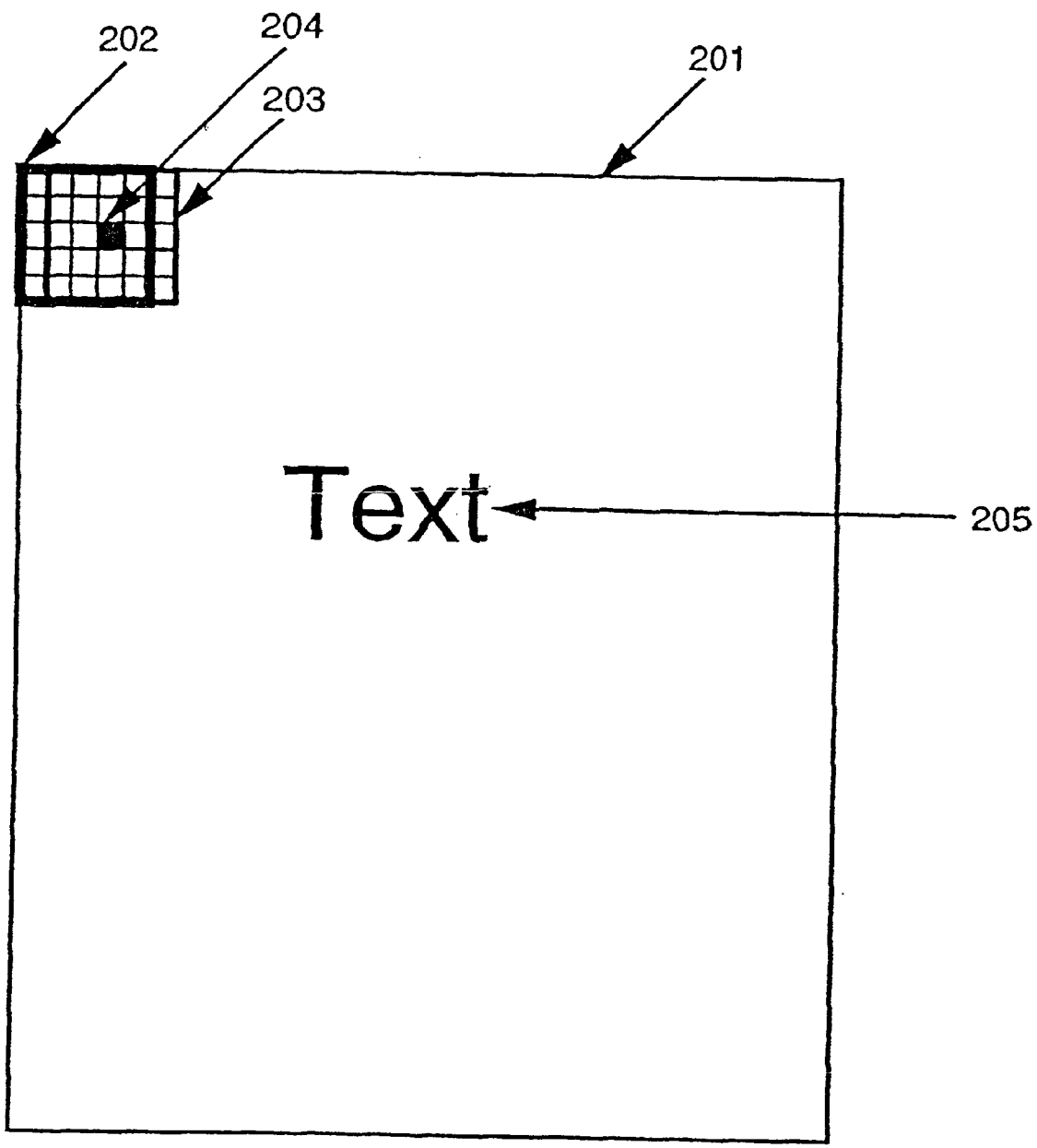
FIG. 2 is a schematic diagram of a 5×5 window moving across a page of text according to the invention.

With respect to FIG. 2, the window 202 is moved along the page 201 and each pixel on the page has a chance to be the center of a window and be allocated ink. The window 202 is repositioned one pixel away to the window position 203 which has a new center pixel 204.

Figure 3:
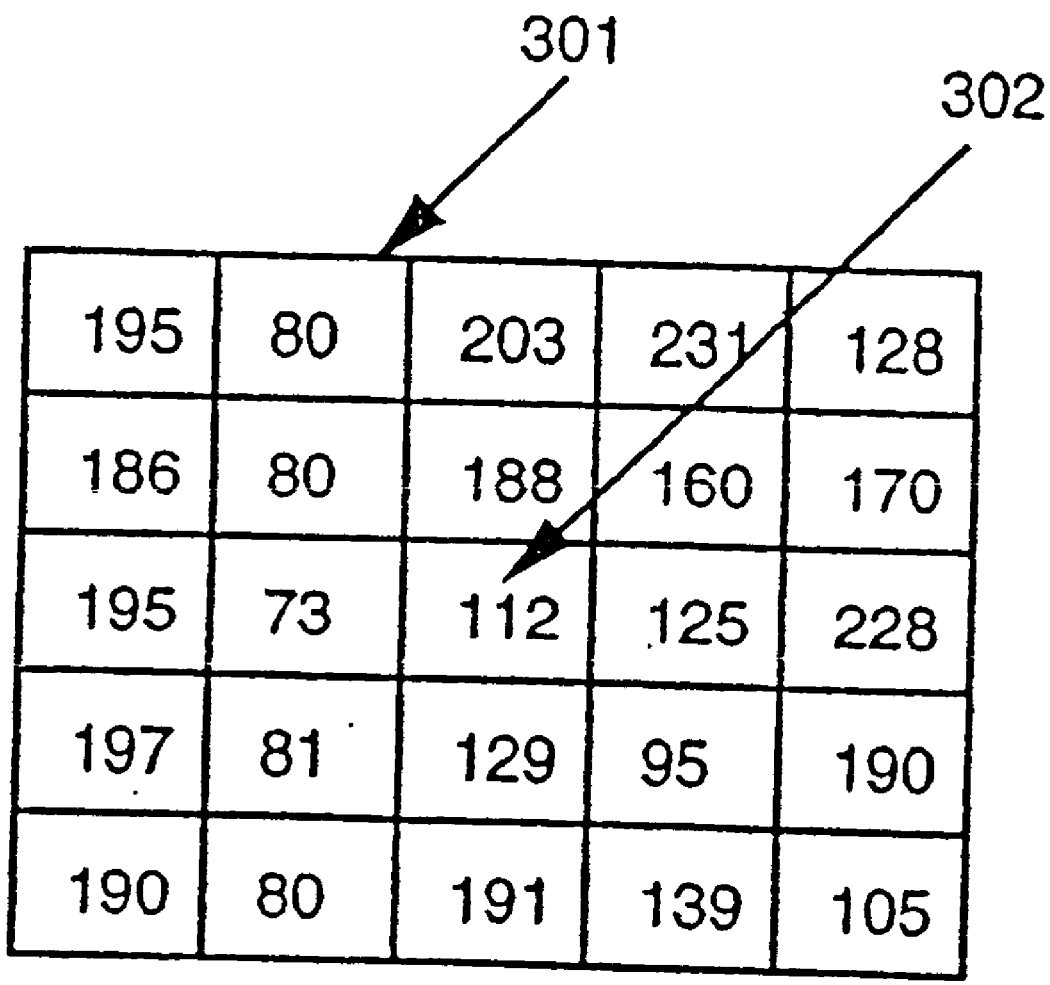
FIG. 3 is a schematic diagram of a 5×5 window with ink values for each pixel in the window according to the invention.

Referring to FIG. 3, a sample window is shown. The window 301 is a five by five window containing ink values of each pixel. Here, the value for black is 0 and white is 255. The center pixel 302 has an ink value of 112.

Figure 4:
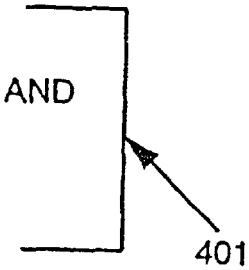
FIG. 4 is a pseudo-code example of the ink reallocation scheme for the center pixel of a window according to the invention.

With respect to FIG. 4, a pseudo-code example of one method used in the invention to calculate the redistribution of ink in a window is shown. This example is useful for text in fax documents. One of the parameters involved is W, the size of the window, which is typically five. The window size is increased when a particularly poor quality document is scanned. The dot_factor indicates how much overlap there is between two pixels when they are scanned. Typically, the one full amount of ink in one scanned pixel will be spread among three pixels. The total amount of ink between the three pixels will not be one full amount of ink, it will be greater. A value of 1.1 indicates that there is a ten percent overhead from the scanning. The ten percent will be filtered out in the reallocation process. It is typically tied to the quality of the scanner and is measured only once for a particular scanner.

Three variables are recorded: how many pixels are darker than the center pixel (count); the amount of ink in the window (sum_dark); and the darkest pixel value in the window (darkest). The three values are calculated across the entire window. The table ink_lut is a simple intensity to ink level transformation look-up table. If there is no prior measurement, the look-up table is initialized to:

$ink\_lut[j]=255-j;$

Four factors are checked to determine the center pixel's ink allocation. First, if the center pixel is dark enough, that is, it is darker than the minimal darkness threshold value, T1. Next, if there is at least one pixel in the window, that is even darker than the minimal darkness value T1-32 (32 is used here as a ⅛ value added to the minimal darkness to indicate the extra degree of darkness desired. It can be changed for any application.). Third, the number of pixels that are darker than the center pixel is less than T2 (how light can the pixel be with respect to its neighbors and be colored black). Finally, if the amount of ink in the window plus three-quarters of the full ink value range is greater than or equal to the number of pixels lighter than the center pixel (count) multiplied by the full dark value and the dot_factor. This checks whether the center pixel should be allocated ink according to the procedure described earlier.

If all of the four factors are true, then the center pixel is set to black. Otherwise the center pixel is set to white.

If the text is very light and the user wants to bring up more ink, T1 is changed to allow more light pixels to be considered candidates for black, and the dot_factor will be set to a value that is less than one which will increase the amount of ink to be put in.

Referring to FIG. 3, using the window 301 as an example, and setting the following parameters: W=5; T1=144; T2=18; dot_factor=1.1, and ink_lut[j]=255−j (for j=0, 1, 2, . . . , 255). The pixel values in the window 301 are processed using the method in FIG. 4. The resulting variables will be set to: sum_dark=2624; count=7; and darkest=73. The center pixel 302 will be set to a new_value which is BLACK.

Figure 5:
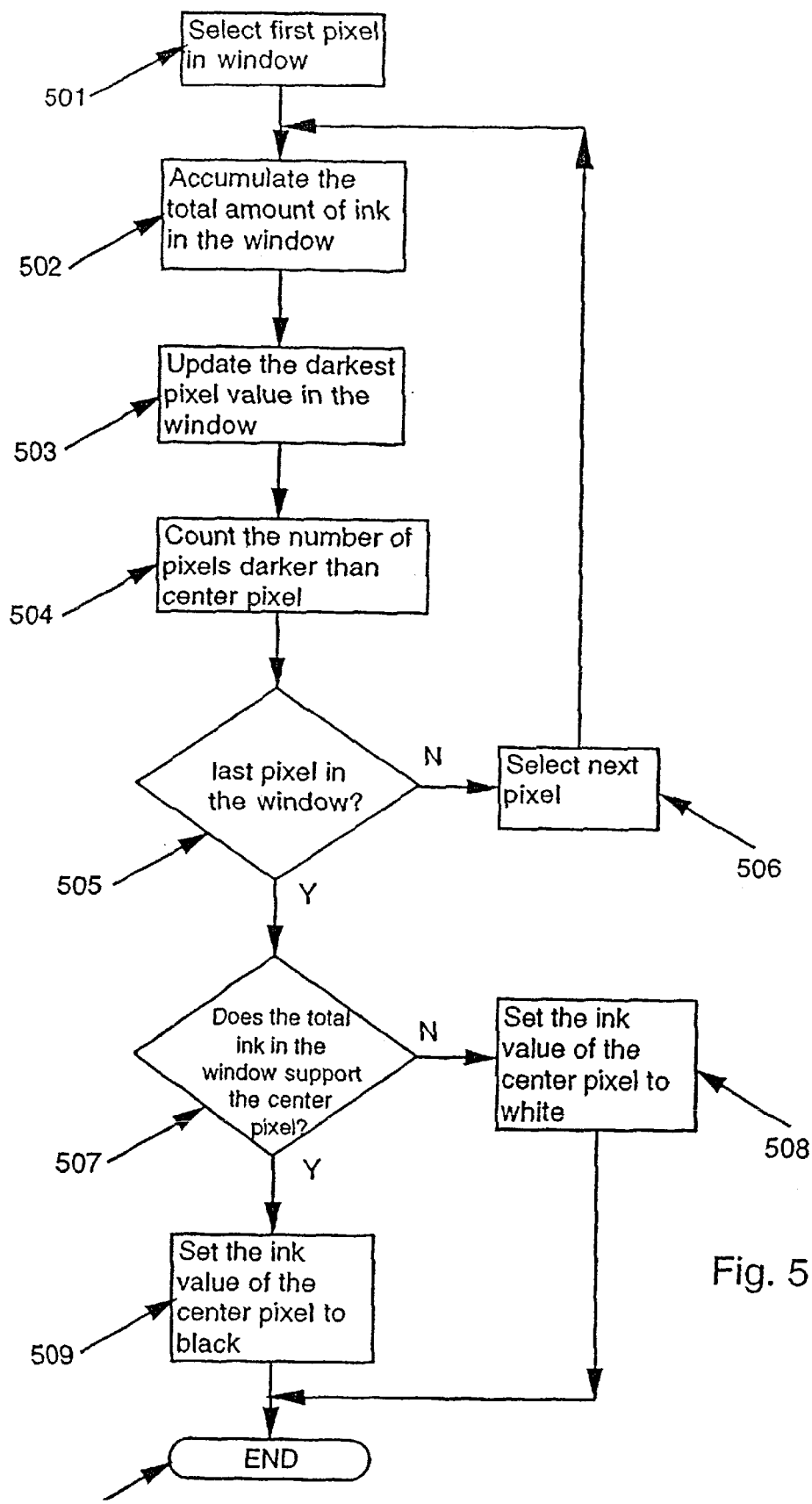
FIG. 5 is a block schematic diagram of a flow diagram of the ink reallocation scheme for the center pixel of a window according to the invention.

With respect to FIG. 5, each time a window is defined on a page, the first pixel in the window is examined 501. The calculation of the total amount of ink in the window is performed 502 and the darkest pixel in the window is calculated 503. The pixels that are darker than the center pixel are counted 503. If the current pixel is not the last pixel in the window 505, then the next pixel is selected 506 and the calculations are performed again. If the last pixel in the window has been examined 505, then the total amount of ink in the window is checked 507 to see if enough is available to support reallocation to the center pixel. If there is an insufficient amount of ink, then the center pixel is set to white 508. Otherwise, the center pixel is set to black 509. The entire process is repeated for every window on the page.

This calculation works for binary (1 bit) output devices. There are other variations of the invention that handle devices with multi-level pixels, i.e., grayscale and color devices.

Figure 6:
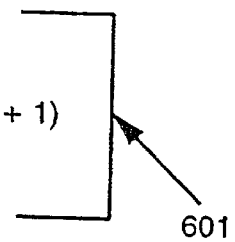
FIG. 6 is a pseudo-code example of the ink distribution code section for the center pixel of a window using the darkest in value in the window according to the invention.

With respect to FIGS. 4 and 6, the distribution calculations 401 are modified 601 to accommodate devices with multi-bit pixel values. Rather than using the maximum dark value possible (255), the darkest pixel in the window is found and is used as an element in the last of the four factors described above. The center pixel is set to the darkest ink value in the window if all of the four factors are true.

Referring to FIG. 7, a pseudo-code example of a method for creating soft characters is shown. The difference between the previous calculations is that the average ink value is calculated across all of the pixels that are lighter than a preferred threshold. If this value has any components, then this average is used as an element in the last of the four factors mentioned above. If there is sufficient in to support the ink allocation to the center pixel, then the center pixel is set to the average ink value in the window. Otherwise, it is set to WHITE.

Figure 8:
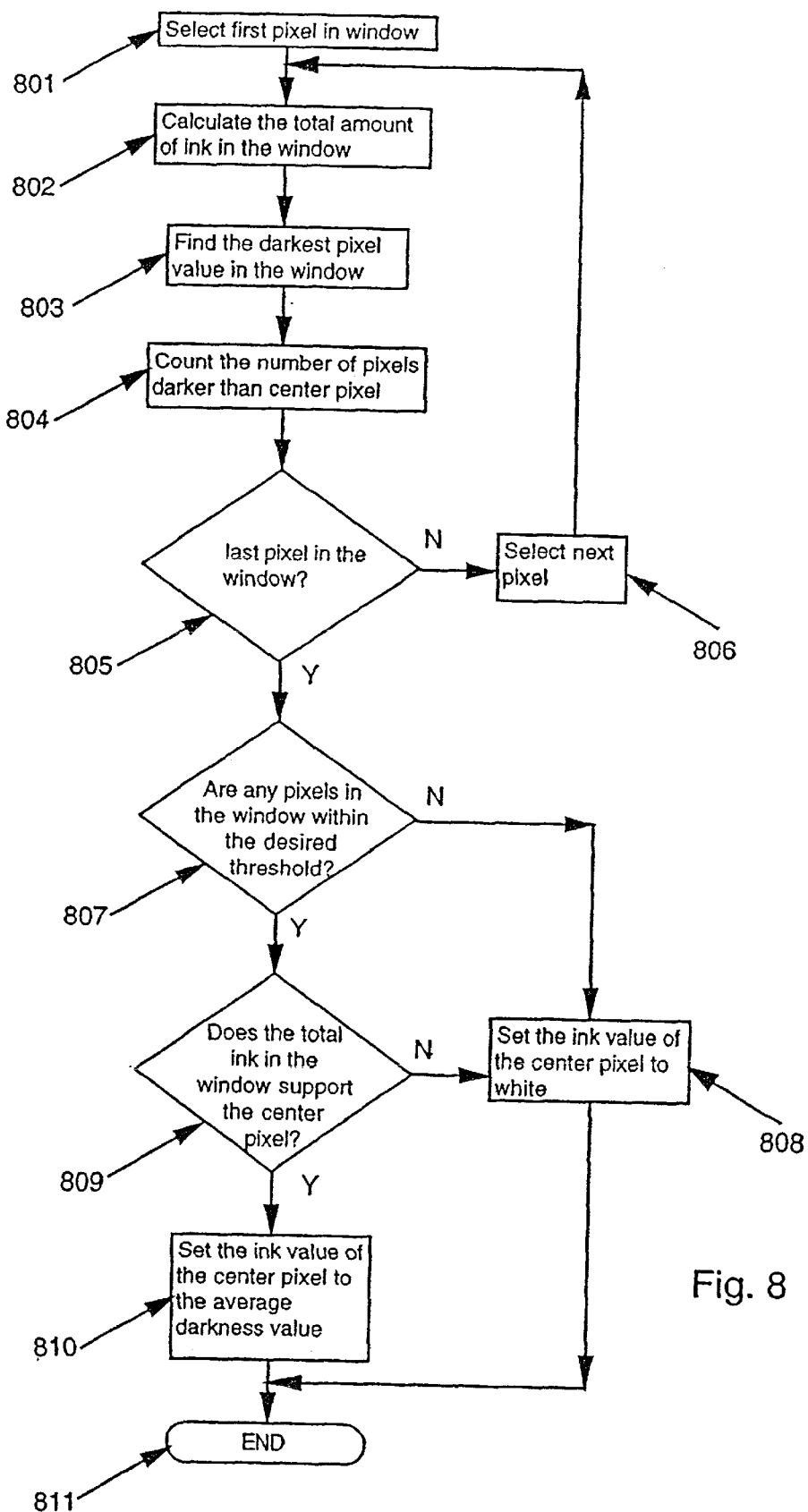
FIG. 8 is a block schematic diagram of a flow diagram of the ink reallocation scheme for the center pixel of a window that uses the average ink value in the window according to the invention.

With respect to FIG. 8, if there are no pixels in the window that fall within the desired threshold 807, then the center pixel is set to WHITE 808. Otherwise, the total amount of ink in the window is checked to see if it will support allocation to the center pixel 809. If it does, then the center pixel is set to the average ink value in the window 810. If the total ink in the window does not support allocation to the center pixel, then the center pixel is set to WHITE 808.

White text on a black background is also processed by reversing the roles of black and white. Color text is processed in the same manner, assuming solid colors, one for the background and one for the text. Each color vector is treated as white and black with proper weighting. The weighting is required because, for example, the intensity of black is higher than red. Color text on a color background is easily processed once the weighting is taken into account. The gray scale value will be used to scale the color value. For example, if the gray scale is 80% black, then the red value will be 80% of full red.

All of the parameters can be preset for systems that have the scanner and printer relations fixed. The user can affect the values of the parameters such as the thresholds. The dot_factor and window size are fixed.

The main idea that must be stressed in this invention is that this approach is based on preserving a quantity that is proportional to the amount of ink in the textual part of the scanned document. By introducing the reallocation of ink, the preservation is achieved and the reallocation results in text that is sharper, crisper, and clearer.

Figure 9:
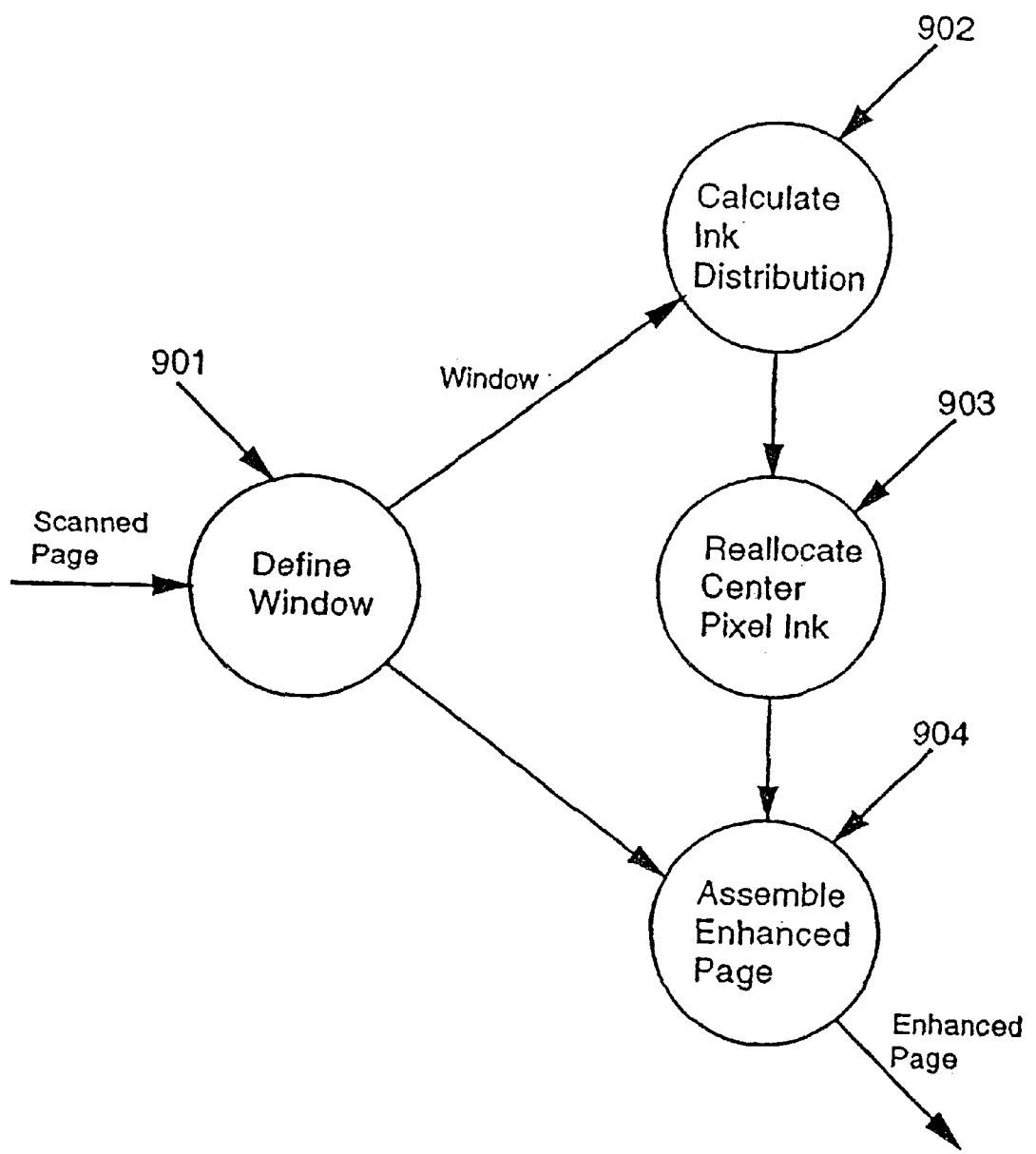
FIG. 9 is a block schematic diagram of a task-oriented view of a preferred embodiment of the invention according to the invention.

With respect to FIG. 9, a task-oriented view of the invention is shown. The Define Window module 901 accepts a scanned page. It defines a window of size W×W on the scanned page and walks the window across the page, pixel by pixel, allowing each pixel on the page to be the center pixel of the window. The Calculate Ink Distribution module 902 calculates the total ink and darkest pixel in the window and also the number of pixels that are darker than the center pixel. The Reallocate Center Pixel Ink module 903 then uses that information and allocates ink to the center pixel according to the thresholds and remaining ink in the window as discussed previously. The enhanced page is output by the Assemble Enhanced Page module 904 which reassembles the page with the new pixel ink values calculated by the Reallocate Center Pixel Ink module 903.

There are many ways to reallocate the ink with this approach and therefore, the invention should not be limited to the explicit values shown. The main component in the invention is that the new ink value in the current pixel is influenced by the total amount of ink in the window and by the relative darkness of the current pixel to the other pixels in the window. Other versions of the invention are related to more complicated patterns that this relative darkness generates. For example, a group of dark/light pixels forms some type of pattern, that fact is taken into account and the invention attempts to put more black in that situation than if a pattern did not exist.

Figure 10:
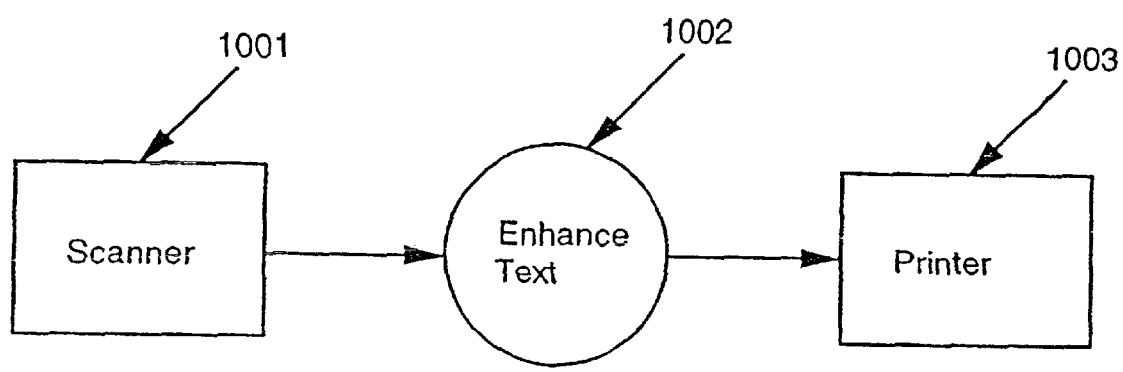
FIG. 10 is a block schematic diagram of the invention accepting input from a scanner and outputting to a printer according to the invention.

Referring to FIG. 10, the invention sits between a scanner 1001 and printer 1003. It accepts a scanned page from the scanner 1001 and enhances the scanned page 1002 before the page is printed on the printer 1003 or output device.

Figure 11:
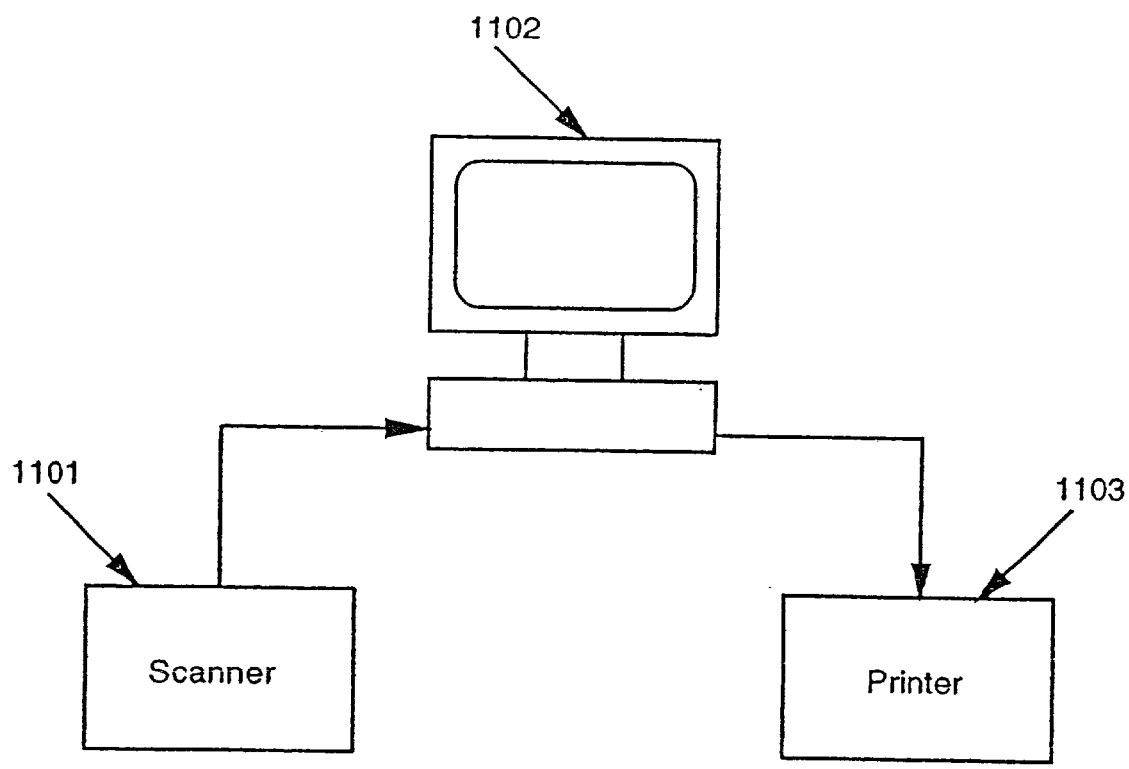
FIG. 11 is a block schematic diagram of the invention residing in a computer which accepts input from a scanner and outputs enhanced pages to a printer according to the invention.

With respect to FIG. 11, the invention resides in a computer 1102. The computer accepts the scanned page from the scanner 1101. The computer 1102 processes the page and sends the page to the printer 1103 for printing. It can also display the enhanced page on the computer display screen.

Figure 12:
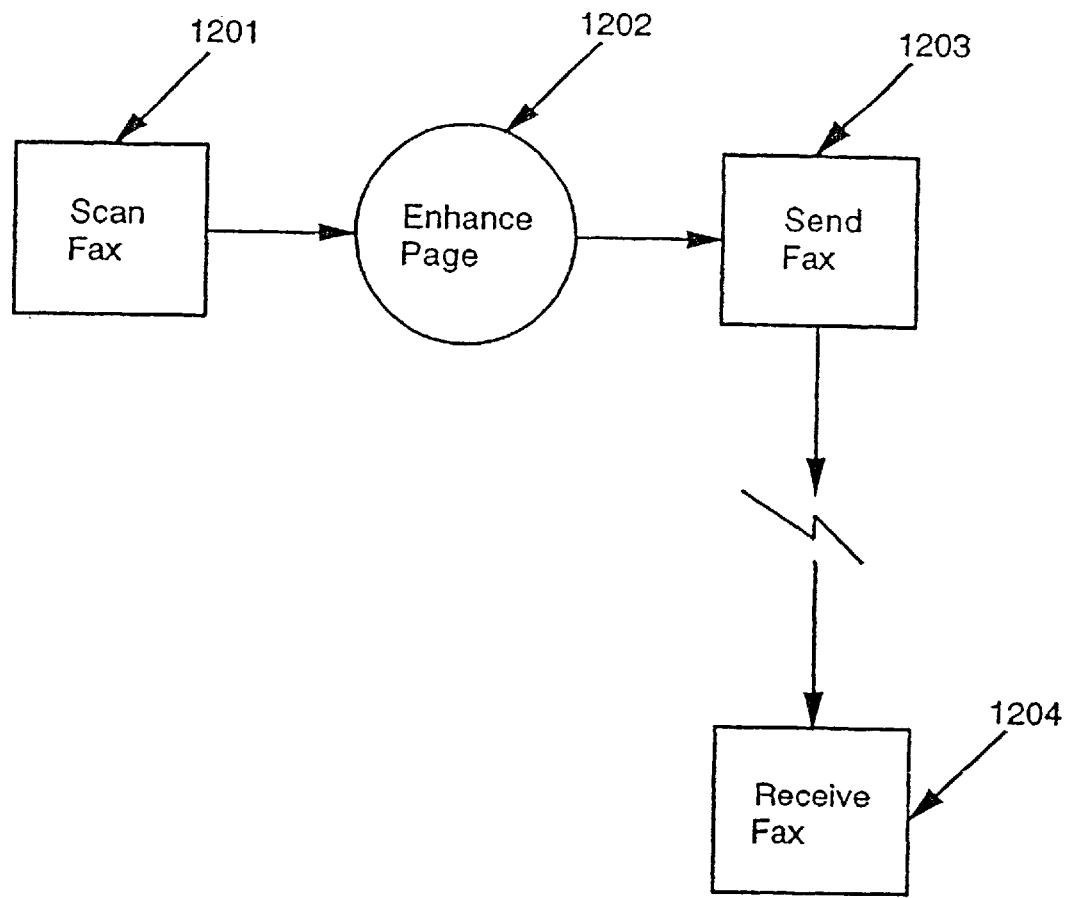
FIG. 12 is a block schematic diagram of the invention enhancing a scanned page which is faxed out to a receiving end according to the invention.

Referring to FIG. 12, the invention is used to enhance fax documents. A fax is scanned 1201 and the scanned page is sent to the Enhance Page module 1202. The page is enhanced and then sent out 1203. The fax is then received on the receive end 1204.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for enhancing the text of a digitally scanned page through the reallocation of ink on said page in a computer environment, comprising:

defining a window of a size W pixels by W pixels;

analyzing the ink distribution in said window;

reallocating the ink to a pixel in the center of said window wherein said reallocation step enhances the contrast of said page;

assembling the enhanced page with the reallocated ink;

calculating the average ink value of all pixels falling within a predetermined threshold in said window;

setting the ink value of said center pixel to white if no pixels in said window fall within said predetermined threshold or the amount of ink in said window is insufficient; and setting the ink value of said center pixel to said average ink value if the amount of ink in said window is sufficient and if any pixels in said window fall within said predetermined threshold.

2. A process for enhancing the text of a digitally scanned page through the reallocation of ink on said page in a computer environment, comprising:

defining a window of a size W pixels by W pixels;

analyzing the ink distribution in said window;

reallocating the ink to a pixel in the center of said window, wherein said reallocation step enhances the contrast of said page;

assembling the enhanced page with the reallocated ink;

setting the ink value of said center pixel to white if the amount of ink in said window is insufficient;

setting the ink value of said center pixel to a remainder grayscale ink value if said grayscale value is less than the ink value of full black, said grayscale value is scaled to the number of bits in the output device; and setting the ink value of said center pixel to black if the amount of ink in said window is sufficient.

3. A process for enhancing the text of a digitally scanned page through the reallocation of ink on said page in a computer environment, comprising:

defining a window of a size W pixels by W pixels;

analyzing the ink distribution in said window;

reallocating the ink to a pixel in the center of said window, wherein said reallocation step enhances the contrast of said page;

assembling the enhanced page with the reallocated ink;

setting the ink value of said center pixel to the background color if the amount of text color ink in said window is insufficient;

setting the ink value of said center pixel to a remainder text color ink value if said remainder text color value is less than the ink value of full text color, said remainder text color value is weighted so that said remainder text color is proportional to the grayscale value; and setting the ink value of said center pixel to the text color if the amount of text color ink in said window is sufficient.

4. An apparatus for enhancing the text of a digitally scanned page through the reallocation of ink on said page in a computer environment, comprising:

a module for defining a window of a size W pixels by W pixels;

a module for analyzing the ink distribution in said window;

a module for reallocating the ink to a pixel in the center of said window, wherein said reallocation module enhances the contrast of said page;

a module for assembling the enhanced page with the reallocated ink;

a module for calculating the average ink value of all pixels falling within a predetermined threshold in said window;

a module for setting the ink value of said center pixel to white if no pixels in said window fall within said predetermined threshold or the amount of ink in said window is insufficient; and a module for setting the ink value of said center pixel to said average ink value if the amount of ink in said window is sufficient and if any pixels in said window fall within said predetermined threshold.

5. An apparatus for enhancing the text of a digitally scanned page through the reallocation of ink on said page in a computer environment, comprising:

a module for defining a window of a size W pixels by W pixels;

a module for analyzing the ink distribution in said window;

a module for reallocating the ink to a pixel in the center of said window, wherein said reallocation module enhances the contrast of said page;

a module for assembling the enhanced page with the reallocated ink;

a module for setting the ink value of said center pixel to white if the amount of ink in said window is insufficient;

a module for setting the ink value of said center pixel to a remainder grayscale ink value if said grayscale value is less than the ink value of full black, said grayscale value is scaled to the number of bits in the output device; and a module for setting the ink value of said center pixel to black if the amount of ink in said window is sufficient.

6. An apparatus for enhancing the text of a digitally scanned page through the reallocation of ink on said page in a computer environment, comprising:

a module for defining a window of a size W pixels by W pixels;

a module for analyzing the ink distribution in said window;

a module for reallocating the ink to a pixel in the center of said window, wherein said reallocation module enhances the contrast of said page;

a module for assembling the enhanced page with the reallocated ink;

a module for setting the ink value of said center pixel to the background color if the amount of text color ink in said window is insufficient;

a module for setting the ink value of said center pixel to a remainder text color ink value if said remainder text color value is less than the ink value of full text color, said remainder text color value is weighted so that said remainder text color is proportional to the grayscale value; and a module for setting the ink value of said center pixel to the text color if the amount of text color ink in said window is sufficient.

7. A program storage medium readable by a computer, tangibly embodying a program of instructions executable by the computer to perform method steps for enhancing the text of a digitally scanned page through the reallocation of ink on said page in a computer environment, said method steps comprising:

defining a window of a size W pixels by W pixels;

analyzing the ink distribution in said window;

reallocating the ink to a pixel in the center of said window, wherein said reallocation step enhances the contrast of said page;

assembling the enhanced page with the reallocated ink;

calculating the average ink value of all pixels falling within a predetermined threshold in said window;

setting the ink value of said center pixel to white if no pixels in said window fall within said predetermined threshold or the amount of ink in said window is insufficient; and setting the ink value of said center pixel to said average ink value if the amount of ink in said window is sufficient and if any pixels in said window fall within said predetermined threshold.

8. A program storage medium readable by a computer, tangibly embodying a program of instructions executable by the computer to perform method steps for enhancing the text of a digitally scanned page through the reallocation of ink on said page in a computer environment, said method steps comprising:

defining a window of a size W pixels by W pixels;

analyzing the ink distribution in said window;

reallocating the ink to a pixel in the center of said window, wherein said reallocation step enhances the contrast of said page;

assembling the enhanced page with the reallocated ink;

setting the ink value of said center pixel to white if the amount of ink in said window is insufficient;

setting the ink value of said center pixel to a remainder grayscale ink value if said grayscale value is less than the ink value of full black, said grayscale value is scaled to the number of bits in the output device; and setting the ink value of said center pixel to black if the amount of ink in said window is sufficient.

9. A program storage medium readable by a computer, tangibly embodying a program of instructions executable by the computer to perform method steps for enhancing the text of a digitally scanned page through the reallocation of ink on said page in a computer environment, said method steps comprising:

defining a window of a size W pixels by W pixels;

analyzing the ink distribution in said window;

reallocating the ink to a pixel in the center of said window, wherein said reallocation step enhances the contrast of said page;

assembling the enhanced page with the reallocated ink;

setting the ink value of said center pixel to the background color if the amount of text color ink in said window is insufficient;

setting the ink value of said center pixel to a remainder text color ink value if said remainder text color value is less than the ink value of full text color, said remainder text color value is weighted so that said remainder text color is proportional to the grayscale value; and setting the ink value of said center pixel to the text color if the amount of text color ink in said window is sufficient.

* * * * *